US010712982B2

(12) United States Patent
Konosu (10) Patent No.: US 10,712,982 B2
(45) Date of Patent: Jul. 14, 2020

(54) IMAGE FORMING APPARATUS AND METHOD FOR CONTROLLING IMAGE FORMING APPARATUS (71) Applicant: CANON KABUSHIKI KAISHA, Tokyo (JP)

(72) Inventor: Yuichi Konosu, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/365,410

(22) Filed: Mar. 26, 2019

(65) Prior Publication Data
US 2019/0303073 A1 Oct. 3, 2019

(30) Foreign Application Priority Data

Mar. 29, 2018 (JP) .................. 2018-065507

(51) Int. Cl.
G06F 3/12 (2006.01)
G06K 15/00 (2006.01)
(52) U.S. Cl.
CPC .......... G06F 3/1238 (2013.01); G06F 3/1221 (2013.01); G06F 3/1256 (2013.01); G06F 3/1259 (2013.01); G06F 3/1285 (2013.01)
(58) Field of Classification Search
None
See application file for complete search history.

(56) References Cited

U.S. PATENT DOCUMENTS

| 2016/0055332 A1* | 2/2016 | Jeansonne | G06F 9/4406 726/22 |
| 2016/0063254 A1* | 3/2016 | Jeansonne | G06F 21/606 713/2 |
| 2017/0255384 A1* | 9/2017 | Hashimoto | G06F 3/0665 |
| 2019/0026470 A1* | 1/2019 | Goda | G06F 1/3203 |
| 2019/0289154 A1* | 9/2019 | Konosu | H04N 1/0088 |

FOREIGN PATENT DOCUMENTS

JP 2009193528 A 8/2009

* cited by examiner

Primary Examiner — Dov Popovici
(74) Attorney, Agent, or Firm — Canon U.S.A., Inc. IP Division

(57) ABSTRACT

An image forming apparatus having a verification function of verifying a predetermined program includes a controller configured to execute the verified predetermined program, a predetermined unit, and a power supply configured to supply power to the controller and the predetermined unit, wherein the power supply is configured to start supplying power to the predetermined unit before the verifying of the predetermined program is completed, and if the predetermined program is confirmed not to be authentic by the verifying, stop supplying power to the predetermined unit.

30 Claims, 8 Drawing Sheets

IMAGE FORMING APPARATUS AND METHOD FOR CONTROLLING IMAGE FORMING APPARATUS

BACKGROUND OF THE INVENTION

Field of the Invention

The present invention relates to an image forming apparatus and a method for controlling an image forming apparatus.

Description of the Related Art

To reduce standby time before acceptance of printing, a configuration that supplies power to a control unit of an image forming apparatus upon activation of the image forming apparatus and immediately supplies power to a predetermined unit (for example, printer unit) has been known.

There have been attacks to exploit software vulnerabilities of a computer system to tamper software thereof and abuse a computer, A configuration that detects program tampering in activating an image forming apparatus or computer has been known.

Japanese Patent Application Laid-Open No, 2009-193528 discusses executing processing for detecting tampering of firmware installed on an image forming apparatus each time the image forming apparatus is activated. If the firmware is detected to have been tampered, the image forming apparatus notifies that the firmware may have been tampered on an operation panel, and disables operations of the image forming apparatus.

After the image forming apparatus is activated and power is supplied to a controller unit and a predetermined unit, if a program for performing power control on the predetermined unit is detected, operations may be disabled in the state where power is supplied to the predetermined unit. In other words, despite the inoperability of the image forming apparatus, power may be supplied to the predetermined unit, which causes wasteful power consumption.

SUMMARY OF THE INVENTION

Embodiments of the present invention are directed to an image forming apparatus that supplies power to a predetermined unit of the image forming apparatus upon an activation of the image forming apparatus, and suppresses power consumption if program tampering is detected.

According to embodiments of the present invention, an image forming apparatus having a verification function of verifying a predetermined program includes a controller configured to execute the verified predetermined program, a predetermined unit, and a power supply configured to supply power to the controller and the predetermined unit, wherein the power supply is configured to start supplying power to the predetermined unit before the verifying of the predetermined program is completed, and if the predetermined program is confirmed to not be authentic by the verifying, stop supplying power to the predetermined unit.

Further features of the present invention will become apparent from the following description of exemplary embodiments with reference to the attached drawings.

DESCRIPTION OF THE EMBODIMENTS

Exemplary embodiments of the present invention will be described in detail with reference to the accompanying drawings. The following exemplary embodiments are not intended to limit the inventions set forth in the claims. All combinations of features described in the exemplary embodiments are not necessarily indispensable to the solving means of the present invention.

Figure 1:
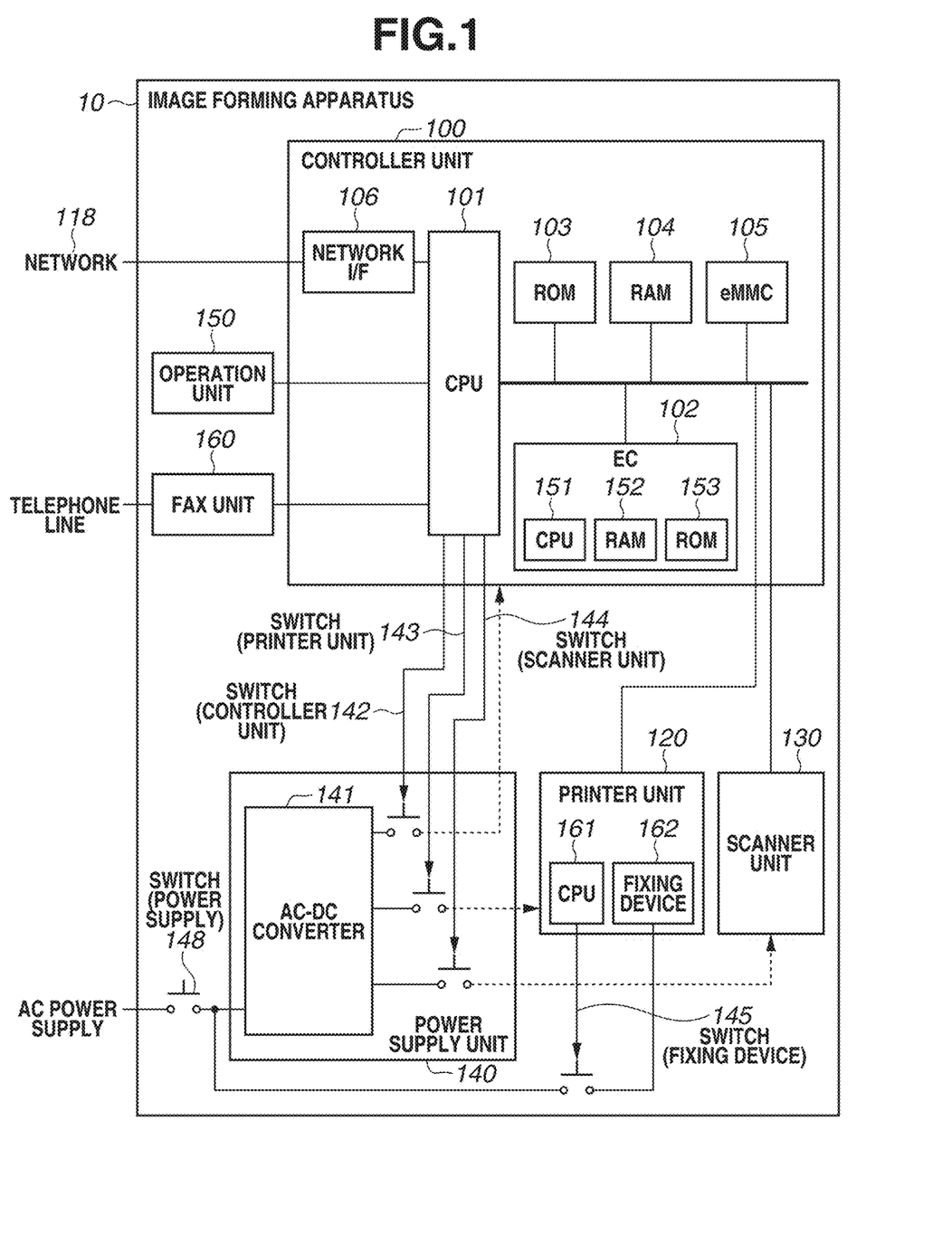
FIG. 1 is a block diagram illustrating a hardware configuration of an image forming apparatus.

FIG. 1 is a block diagram illustrating an example of a configuration of an image forming apparatus 10 according to an exemplary embodiment. The image forming apparatus 10 illustrated in FIG. 1 includes an operation unit 150, a facsimile (FAX) unit 160, a controller unit 100, a printer unit 120, a scanner unit 130, a power supply unit 140, a switch 145, and a switch 148.

The controller unit 100 is a central processing unit (CPU) system. The controller unit 100 includes a CPU 101, a read-only memory (ROM) 103, a random access memory (RAM) 104, an embedded MultiMedia Card (eMMC) 105, a network interface (I/F) 106, and an embedded controller (EC) 102.

The CPU 101 executes a software program stored in the RAM 104 and controls the entire image forming apparatus 10. The ROM 103 stores, for example, a program for performing processing related to activation of the controller unit 100, and fixed parameters. The RAM 104 stores a program and temporary data when the CPU 101 controls the image forming apparatus 10.

The CPU 101, the RAM 104, and the ROM 103 of the image forming apparatus 10 are configured as a main controller for controlling a system of the image forming apparatus 10 in a centralized manner.

The EC 102 includes a CPU 151, a RAM 152, and a ROM 153. The ROM 153 stores a software program of the EC 102. The RAM 152 temporarily stores the software program stored in the ROM 153. The CPU 151 executes, as a sub controller unit, the software program stored in the RAM 152 and performs part of control in the image forming apparatus 10.

The CPU 151, the RAM 152, and the ROM 153 of the EC 102 are configured as a sub controller for controlling system activation for the image forming apparatus 10, compared to the main controller.

The eMMC 105 stores, as main storage, a program to be executed by the CPU 101 and various data. While an eMMC is used as a storage means, a hard disk drive (HDD) may be used instead.

The network I/F 106 transmits and receives data to/from a network 118.

The power supply unit 140 supplies power to the image forming apparatus 10. If the image forming apparatus 10 is powered off, an alternating-current (AC) power supply is cut off by a switch 148, When the switch 148 turns on the apparatus, AC power is supplied to an alternating-current-to-direct-current (AC-DC) converter 141, whereby a direct-current (DC) power supply is generated.

The power supply unit 140 (as a power supply apparatus) can control a power state of the entire image forming apparatus 10 with three independent power supplies based on instructions from the CPU 101. The DC power supply to the controller unit 100 is controlled by a switch 142, The DC power supply to the printer unit 120 is controlled by a switch 143. The DC power supply to the scanner unit 130 is controlled by a switch 144.

Next, other units and switches will be described.

A FAX unit 160 transmits and receives a digital image via a telephone line.

An operation unit 150 includes an operation touch panel, a display screen, and a key.

A scanner unit 130 reads a document and generates monochrome binary image data or color multi valued image data. The scanner unit 130 is connected to the CPU 101 via a not-illustrated scanner control I/F. The CPU 101 controls an image signal input from the scanner unit 130 via the scanner control I/F.

The printer unit 120 prints, on a sheet, image data converted from page description language (PDL) data accepted via the network I/F 106 or image data generated by the scanner unit 130.

The printer unit 120 includes a CPU 161 and a fixing device 162, The fixing device 162 fuses, by heat and pressure, a toner image transferred onto a sheet and fix the image on the sheet. As illustrated in FIG. 1, the fixing device 162 is supplied with power by the AC power supply via the switch 145 to generate heat. The fixing device 162 may be supplied with power via the AC-DC converter 141. The CPU 161 functions as a printer controller by using a not-illustrated RAM. The CPU 161 is supplied with power via the AC-DC converter 141. The CPU 161 controls the power supply to the fixing device 162 by using the switch 145.

Whether to supply power to the image forming apparatus 10 is decided by turning on or off the switch 148.

Figure 2:
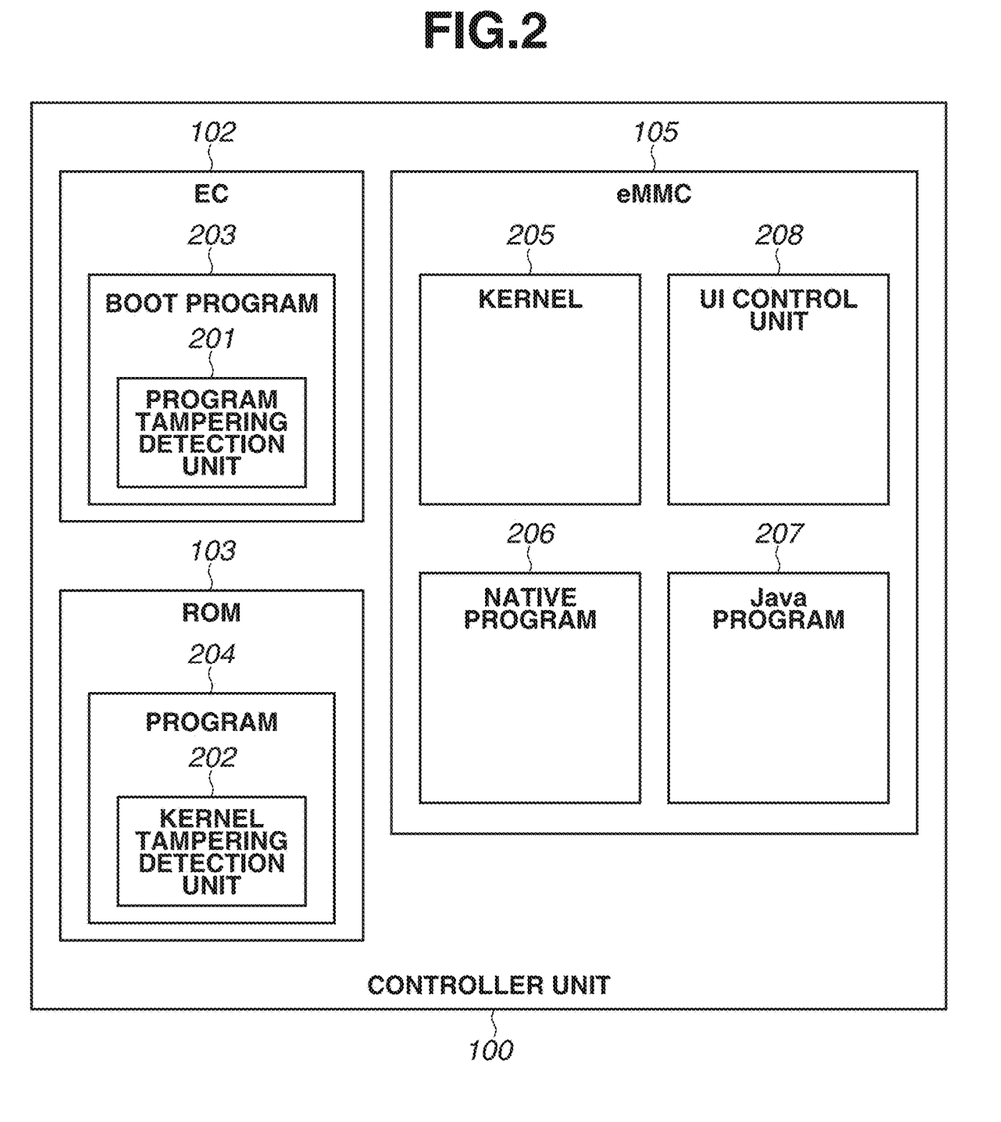
FIG. 2 is a block diagram illustrating a software configuration of the image forming apparatus.

FIG. 2 is a block diagram illustrating software modules of the image forming apparatus 10 according to the present exemplary embodiment.

A user interface (UI) control unit 208 receives an input accepted by the operation unit 150, performs processing based on the input, and controls screen output to the operation unit 150.

When the image forming apparatus 10 is powered on, a boot program 203 is a program executed by the CPU 151 included in the EC 102. The boot program 203 is stored in the ROM 153 of the EC 102.

When the boot program 203 is executed, the boot program 203 performs processing related to the activation of the image forming apparatus 10. Examples of such processing include cancelling a reset state of the CPU 101 to which power is supplied. A program tampering detection unit 201 included in the boot program 203 detects tampering on a program 204.

The program 204 is executed by the CPU 101 after the execution of the boot program 203. The program 204 is stored in the ROM 103. The execution of the program 204 includes turning on the switch 145 for supplying power to the printer unit 120. The execution of the program 204 also includes initializing the operation unit 150 to make drawing possible on a touch panel or display screen. A kernel tampering detection unit 202 included in the program 204 detects tampering on a kernel 205.

The kernel 205, the UI control unit 208, a native program 206, and a Java® program 207 are stored in the eMMC 105.

The kernel 205 is a program executed by the CPU 101 after the processing of the program 204 is completed. The kernel 205 activates the native program 206 and the Java program 207. The kernel 205 may include a unit for detecting tampering of the native program 206.

The native program 206 is a program executed by the CPU 101, and includes a plurality of programs for providing functions in cooperation with the Java program 207 of the image forming apparatus 10. Examples of the plurality of programs include a program for controlling a scanner I/F, a program for controlling a printer I/F, and an activation program.

An activation program included in the native program 206 is called by the kernel 205 and performs activation processing. The native program 206 may include a unit for detecting tampering of the Java program 207.

The Java program 207 is a program executed by the CPU 101, and is configured to provide each function in cooperation with the native program 206 of the image forming apparatus 10. An example of the Java program 207 is a program for displaying a screen on the operation unit 150.

Figure 3:
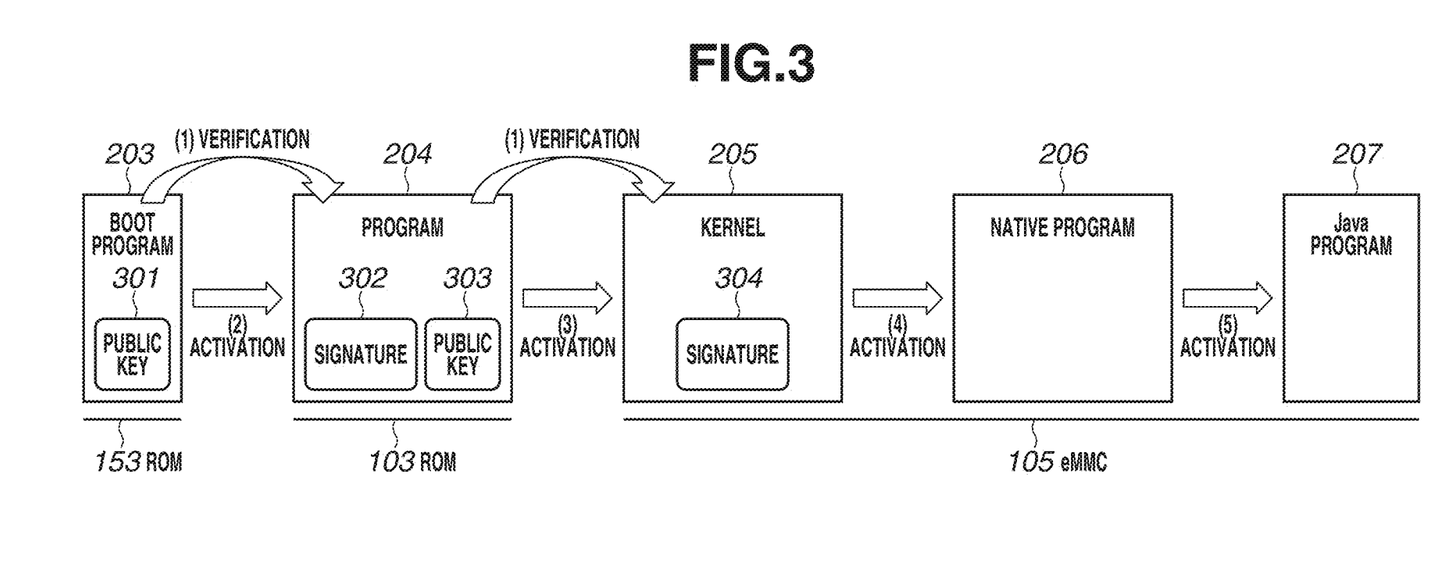
FIG. 3 is a block diagram illustrating an operation flow of the image forming apparatus during activation.

FIG. 3 is a block diagram illustrating a procedure for activating software modules in response to an acceptance of an ON instruction by the image forming apparatus 10 according to the present exemplary embodiment.

FIG. 3 illustrates storage locations of the respective programs and storage locations of digital signatures (hereinafter, referred to as signatures) and public keys (information for confirmation) for validating the authenticity of the signatures. The boot program 203 stores a public key 301 for signature validation of the program 204. The program 204 stores a signature 302 on the program 204 and a public key 303 for signature validation of the kernel 205. The kernel 205 stores a signature 304 on the kernel 205.

In the tampering detection according to the present exemplary embodiment, the program tampering detection unit 201 and the kernel tampering detection unit 202 validate the authenticity of (or verify) the respective next programs (modules) to be activated. The image forming apparatus 10 executes a program if the authenticity of the program is successfully validated. If the authenticity of a program fails to be validated, the image forming apparatus 10 does not execute the program because the program may have been tampered.

If the image forming apparatus 10 accepts the ON instruction, the EC 102 activates the boot program 203. The boot program 203 detects tampering for the next program to be activated. Specifically, the boot program 203 validates the authenticity of the signature 302 on the program 204 by using the public key 301 stored in the boot program 203 (i.e., the boot program 203 confirms that the program 204 is not tampered). If the authenticity of the signature 302 on the program 204 is successfully validated, the CPU 101 activates the program 204.

The program 204 detects tampering detection on the kernel 205 to be activated next. Specifically, the program 204 validates the authenticity of the signature 304 on the kernel 205 by using the public key 303 stored in the program 204. If the signature 304 on the kernel 205 is successfully validated, the CPU 101 activates the native program 206, and activates the activation program included in the native program 206. The activation program activates the Java program 207, The native program 206 and the Java program 207 then provide the functions of the image forming apparatus 10 in cooperation with each other. In such a manner, activation control of the programs is performed in a predetermined order. When the activation of the preceding program is completed, processing for activating the next program is executed.

The public keys and signatures are desirably attached to the programs in advance before factory shipment of the image forming apparatus 10.

Tampering detection may be performed for the native program 206 and the Java program 207. In such a case, the kernel 205 stores the signature 304 on the kernel 205 and a public key for signature validation of the native program 206. Further, the native program 206 stores a signature on the native program 206 and a public key for signature validation of the Java program 207, and the Java program 207 stores a signature in the Java program 207.

Next, a processing procedure activated in response to the power-on of the image forming apparatus 10 according to the present exemplary embodiment will be described with reference to FIG. 4.

Figure 4:
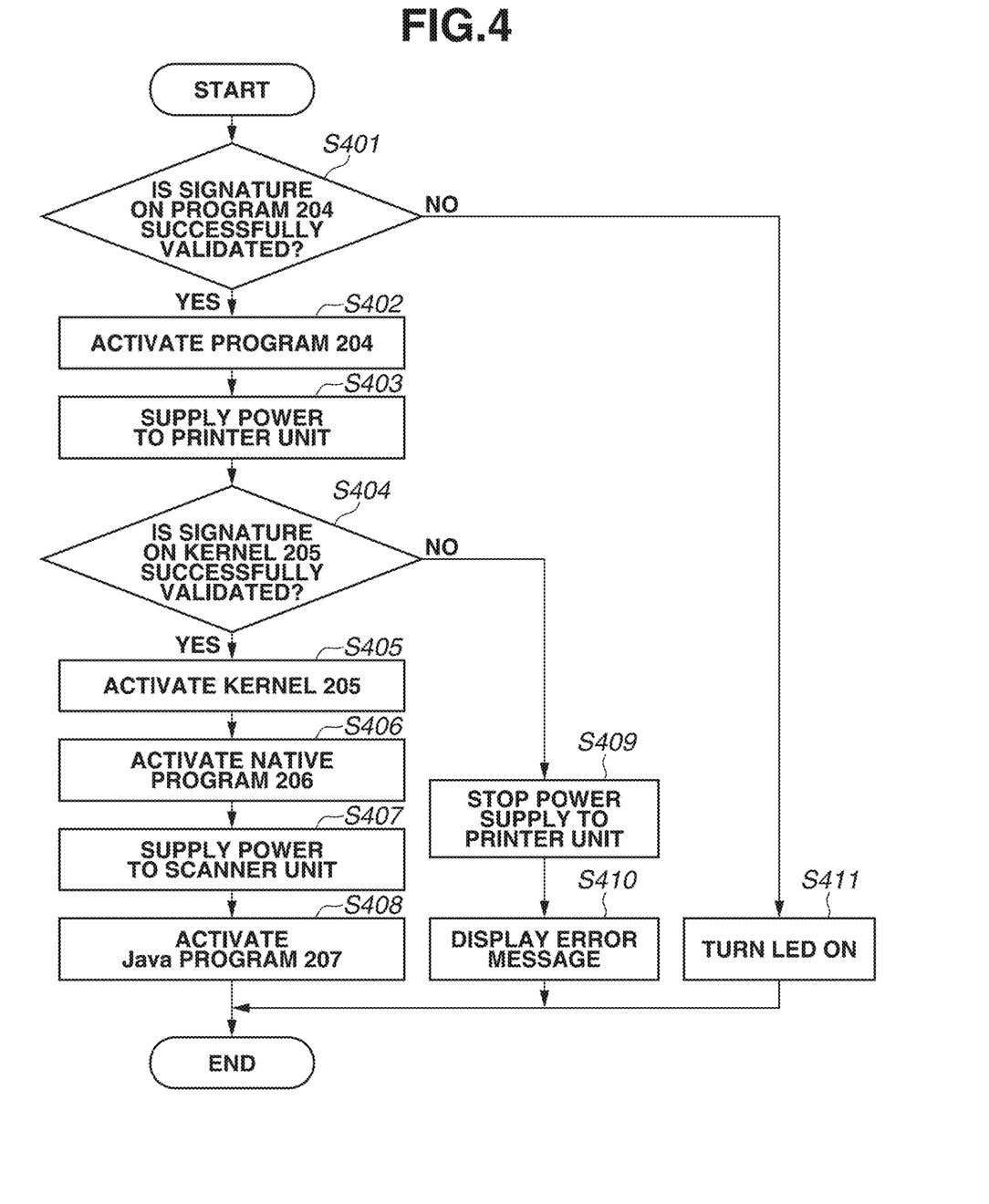
FIG. 4 is a flowchart illustrating a processing procedure of the image forming apparatus during activation.
Figure 5A:
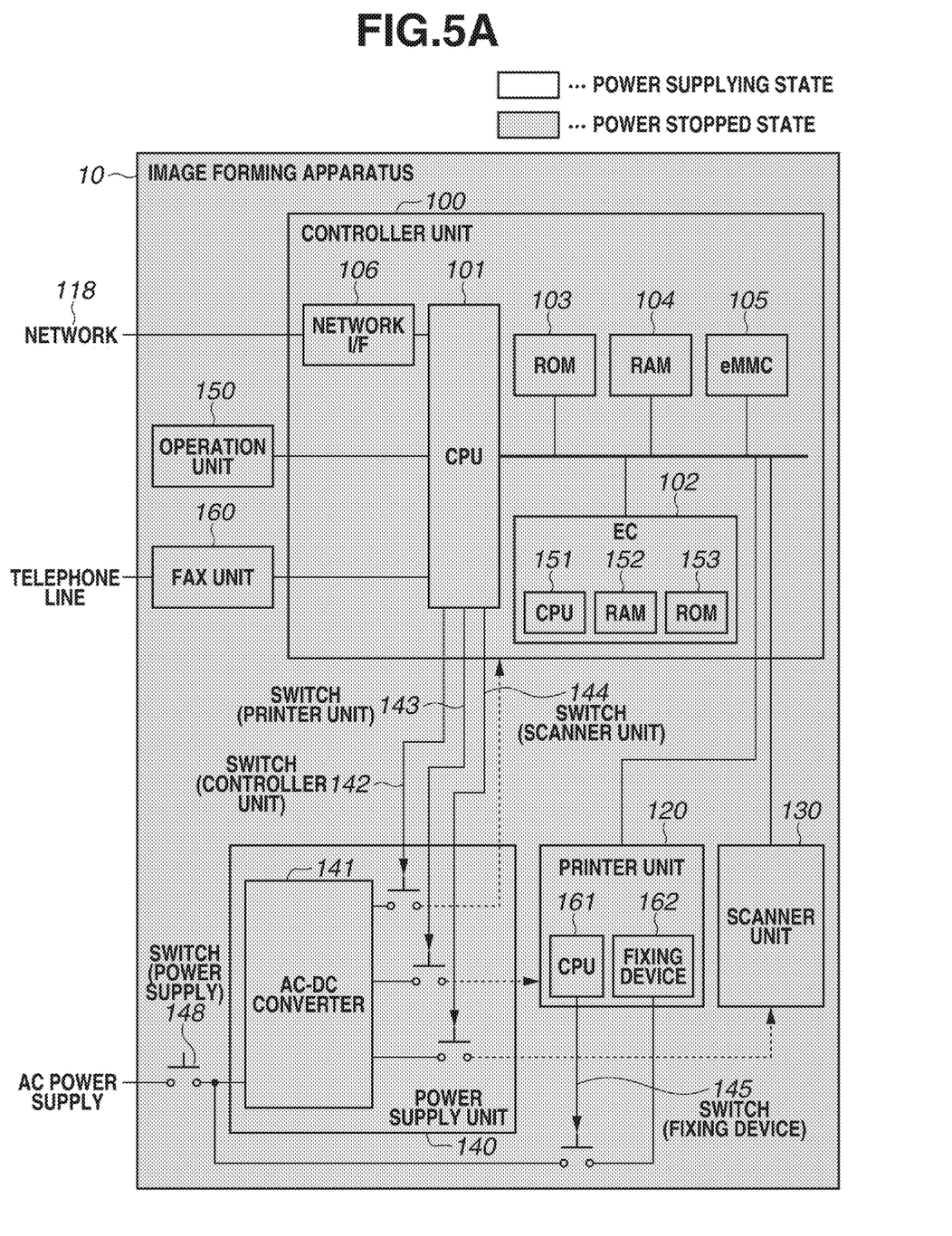
FIGS. 5A, 5B, 5C, and 5D are block diagrams illustrating power supply states of each unit included in the image forming apparatus.

FIG. 5A illustrates a power supply state of the image forming apparatus 10 before the flow of FIG. 4 is started, i.e., before the image forming apparatus 10 is activated. In the present exemplary embodiment, a transition of the image forming apparatus 10 from an off state (shut down) to an on state (power supplying state) will be referred to as "activation". Specific examples include the case when the user presses a power key (power button) of the image forming apparatus 10 in a power-off state.

If the button (power key) for transitioning the image forming apparatus 10 from the off state to the on state is selected, the flowchart of FIG. 4 starts and power is supplied to the controller unit 100. Immediately after the start in the flowchart of FIG. 4, the EC 102 (CPU 151, RAM 152, and ROM 153) that is the sub controller performs the processing. Power is also supplied to the operation unit 150.

Figure 5B:
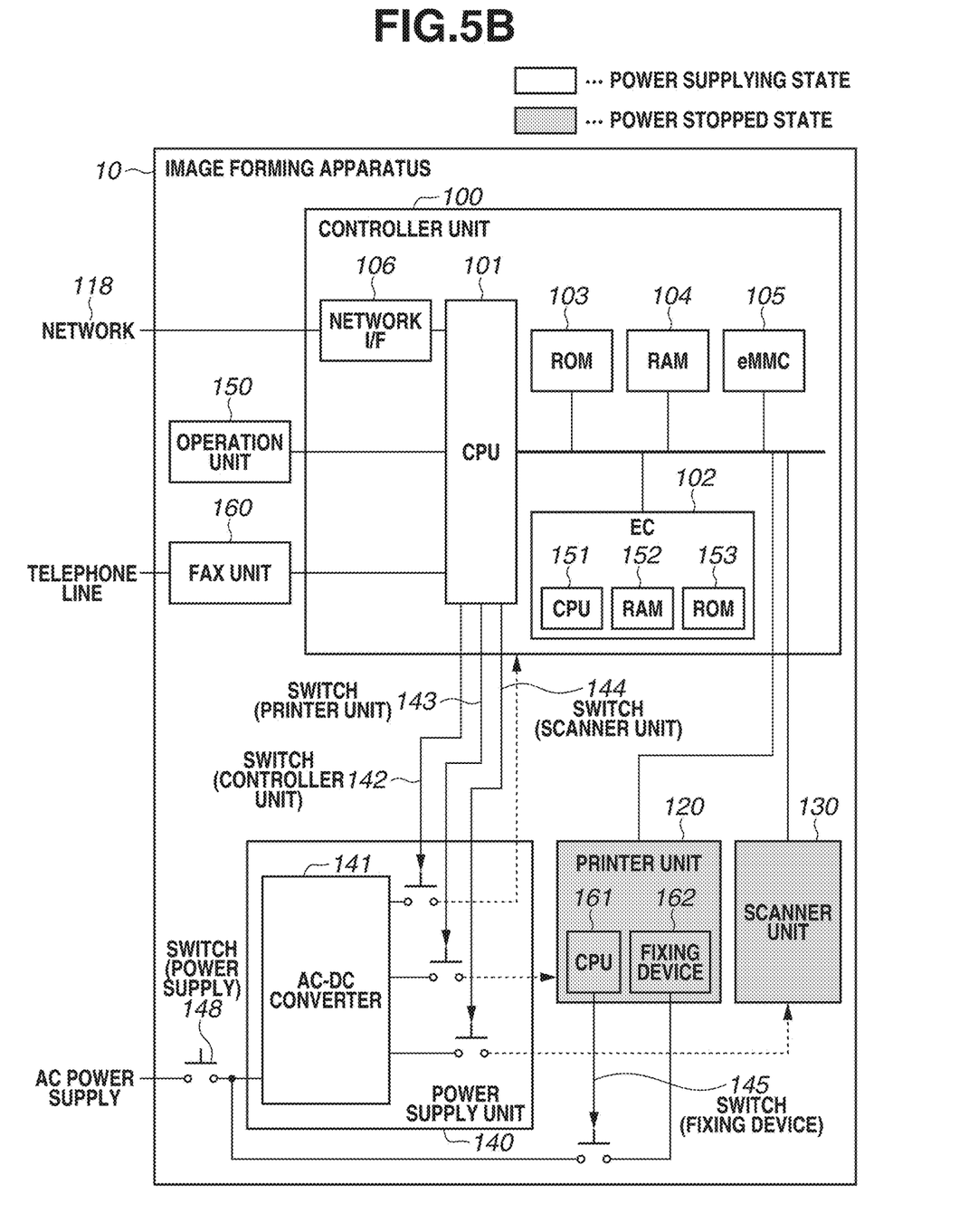

The power state of the image forming apparatus 10 transitions from the state of FIG. 5A to that of FIG. 5B. The boot program 203 is read from the ROM 153 and stored into the RAM 152 when power is supplied to the controller unit 100.

The CPU 151 of the EC 102 then performs step S401. In step S401, the program tampering detection unit 201 included in the hoot program 203 validates the authenticity of the signature 302 on the program 204, Specifically, the program tampering detection unit 201 validates the authenticity of the signature 302 by using the public key 301.

In step S401, if the authenticity of the signature 302 fails to be validated (NO in step S401), the processing proceeds to step S411. In step S411, the CPU 151 turns on a light-emitting diode (LED) included in the operation unit 150. If the authenticity of the signature 302 is successfully validated (YES in step S401), the processing proceeds to step S402.

In step S402, the CPU 151 reads the program 204 and the public key 303 from the eMMC 105 and stores the program 204 and the public key 303 into the RAM 104 and activates the program 204, When the program 204 starts, the CPU 151 releases the reset state of the CPU 101 in which the CPU 101 is supplied with power but in the reset state. If the reset state is released, the CPU 101 can control screen output to the operation unit 150.

The subsequent processing is performed by the controller unit 100.

Figure 5C:
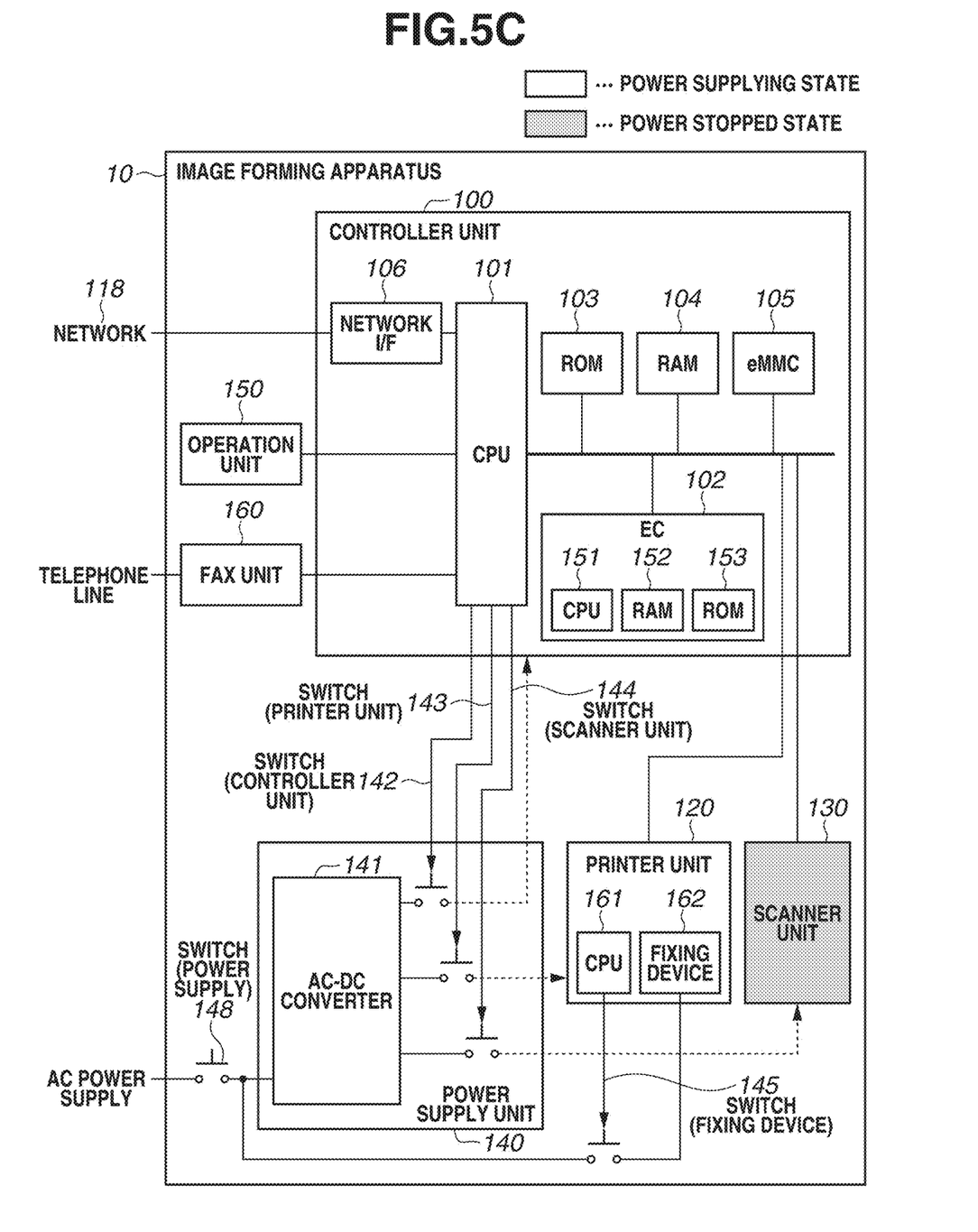

After step S402, the processing proceeds to step S403. In step S403, the CPU 101 turns on the switch 143 to supply power to the printer unit 120 and activate the printer unit 120. When the printer unit 120 is supplied with power, the CPU 161 turns on the switch 145. As a result, the fixing device 162 starts rising in temperature. The power supply state of the image forming apparatus 10 at this moment is illustrated in FIG. 5C.

As described above, if the image forming apparatus 10 is powered on and the reset state of the CPU 101 is released, the CPU 101 supplies power to the printer unit 120. Thus, the CPU 101 can start heating the fixing device 162 of the printer unit 120 at an early stage and reduce the time elapsed until the print function becomes available.

The kernel tampering detection unit 202 reads the kernel 205 from the eMMC 105 and stores the kernel 205 into the RAM 104. After step S403, the processing proceeds to step S404.

In step S404, the kernel tampering detection unit 202 validates the authenticity of the signature 304 on the kernel 203. Specifically, the kernel tampering detection unit 202 validates the authenticity of the signature 304 by using the public key 303.

In step S404, if the authenticity of the signature 304 is successfully validated (YES in step S404), the processing proceeds to step S405.

In step S405, the program 204 activates the kernel 205 stored in the RAM 104. Upon activation, the kernel 203 performs various types of initialization processing. After step S405, the processing proceeds to step S406.

In step S406, the kernel 205 loads the native program 206 into the RAM 104 and activates the native program 206. The processing proceeds to step S407.

Figure 5D:
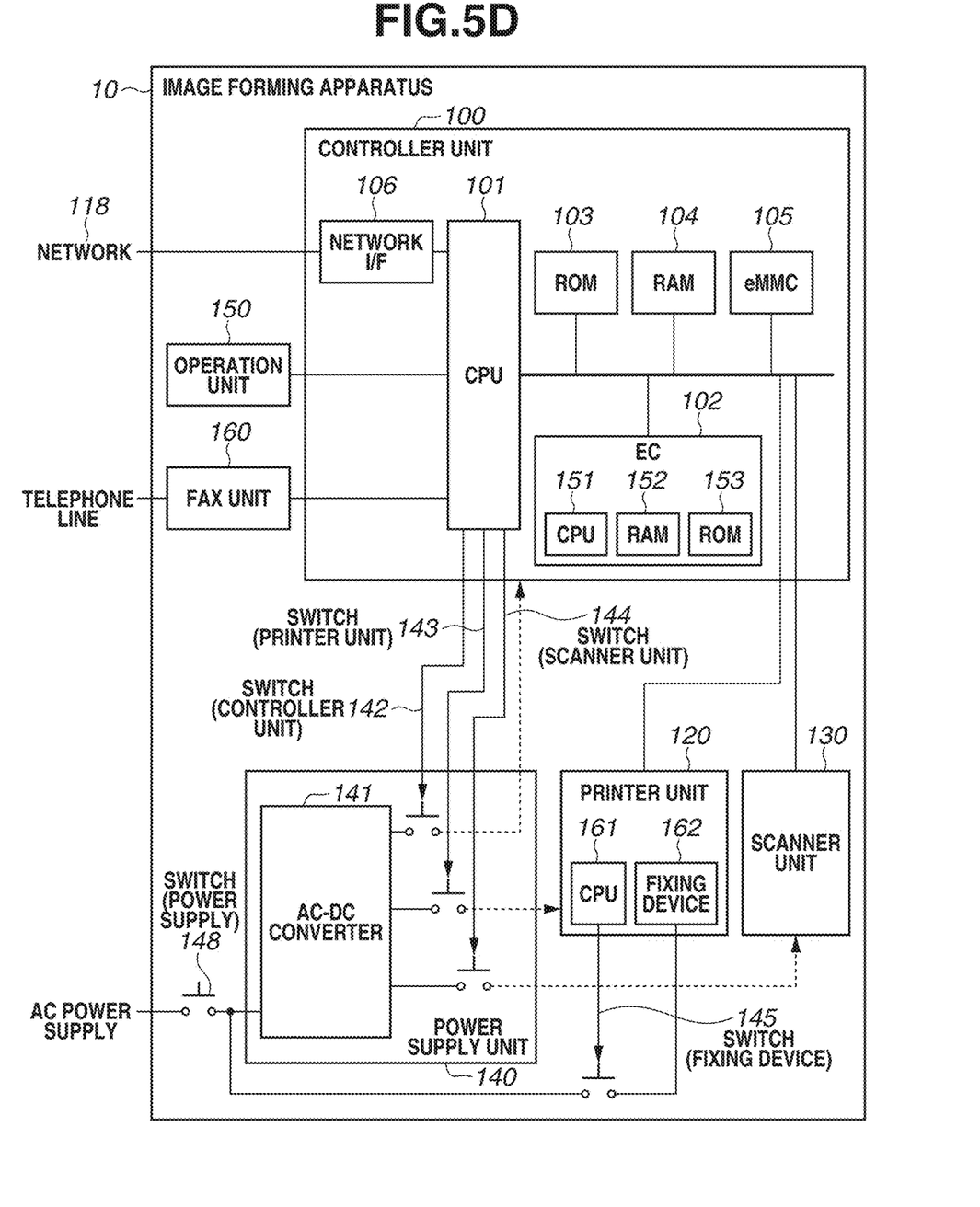

In step S407, the native program 206 turns on the switch 144 to supply power to the scanner unit 130, The scanner unit 130 is thereby activated. The power state of the image forming apparatus 10 transitions from the state of FIG. 5C to the state of FIG. 5D, After step S407, the processing proceeds to step S408.

In step S408, the native program 206 loads the Java program 207 into the RAM 104 and activates the Java program 207.

After step S408, the activation processing procedure ends.

In step S404, if the authenticity of the signature 304 fails to be validated (NO in step S404), the processing proceeds to step S409.

In step S409, the CPU 101 issues an instruction to the printer unit 120 to turn off the switch 145, The CPU 161 (i.e., printer controller) receives the instruction and turns off the switch 145 that supplies power to the fixing device 162. After the switch 145 is off, the temperature of the fixing device 162 starts to drop. If the switch 145 is turned off, the CPU 101 turns off the switch 143 to stop the power supply for the printer unit 120 and thus the printer unit 120 shuts down. The power supply state of the image forming apparatus 10, at this moment, is illustrated in FIG. 5B.

After step S409, the processing proceeds to step S410, in step S410, the CPU 101 displays an error message on the operation unit 150. The error message appears on a screen displaying, for example, an error code. Steps S409 and S410 may be performed in reverse order or simultaneously. While an error message is displayed here, the notification to the user may be made by turning on an LED, In such a case, the power supplied to the operation unit 150 may be turned off.

After step S410, the activation processing procedure ends.

As described above, according to the present exemplary embodiment, the printer unit 120 of the image forming apparatus 10 is supplied with power in response to the activation of the image forming apparatus 10, and if program tampering is detected, the power supply to the printer unit 120 is stopped. Thus, suppression of power consumption is achieved.

In the present exemplary embodiment, the printer unit 120 is supplied with power in response to the activation of the image forming apparatus 10. However, this is not restrictive.

The controller unit 100 and at least one unit may be supplied power in response to the activation of the image forming apparatus 10, and if program tampering is detected, the CPU 151 may stop the power supply to the at least one unit.

As one example of the above configuration, a scanner unit 130 is supplied with power in response to the activation of the image forming apparatus 10. In such a configuration, the CPU 151 stops the power supply to the scantier unit 130 if program tampering is detected. As another example, a scanner unit 130 and a printer unit 120 are supplied power in response to the activation of the image forming apparatus 10. In such a configuration, the CPU 151 stops the power supply to the scanner unit 130 and the printer unit 120 if program tampering is detected.

The present invention is not limited to the foregoing exemplary embodiment, and various modifications may be made thereto. While the ROM 103 and the eMMC 105 are the storage locations of the programs according to the exemplary embodiment, the storage locations are not limited thereto and other storage media may be used. The storage locations for the programs may be different from those described above, and the programs may be stored in other storage media.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-065507, filed Mar. 29, 2018, which is hereby incorporated by reference herein in its entirety.

What is claimed is:

1. An image forming apparatus having a verification function of verifying a predetermined program, the image forming apparatus comprising:
    a controller configured to execute the verified predetermined program;
    a predetermined unit; and
    a power supply configured to supply power to the controller and the predetermined unit,
    wherein the power supply is configured to start supplying power to the predetermined unit before the verifying of the predetermined program is completed, and if the predetermined program is confirmed not to be authentic by the verifying, stop supplying power to the predetermined unit.

2. The image forming apparatus according to claim 1, wherein the predetermined program is a program to be executed by the controller after a boot program of the controller.

3. The image forming apparatus according to claim 2, further comprising another controller configured to verify the boot program of the controller.

4. The image forming apparatus according to claim 3, wherein the controller is configured to execute the boot program verified by the another controller and then verify the predetermined program.

5. The image forming apparatus according to claim 3, wherein the power supply is configured to start supplying power to the predetermined unit after the verifying of the boot program is completed and before the verifying of the predetermined program is completed.

6. The image forming apparatus according to claim 3,
    wherein the controller is configured to cause a notification unit to make a notification of predetermined information based on a verification result of the predetermined program, and
    wherein the another controller is configured to cause another notification unit to make a notification of other predetermined information based on a verification result of the boot program.

7. The image forming apparatus according to claim 1, wherein the power supply is configured to, after the verifying of the predetermined program is completed, continue supplying power to the controller regardless of a result of the verifying.

8. The image forming apparatus according to claim 1, wherein the predetermined unit is included in a printer unit.

9. The image forming apparatus according to claim 1, wherein the predetermined unit is a fixing device configured to thermally fix toner on a sheet to the sheet.

10. The image forming apparatus according to claim 9, wherein the fixing device to which power is supplied from the power supply starts heating before the verifying of the predetermined program is completed.

11. The image forming apparatus according to claim 10, wherein the fixing device is configured to, if the predetermined program is verified not to be authentic by the verifying of the predetermined program, stop heating.

12. The image forming apparatus according to claim 9, wherein the fixing device is configured to start heating in response to power supply to the fixing device, and to stop heating in response to stop of the power supply to the fixing device.

13. The image forming apparatus according to claim 1, wherein the predetermined program includes a kernel program.

14. The image forming apparatus according to claim 1, wherein the predetermined program includes a program which is used for a communication between the controller and the predetermined unit.

15. The image forming apparatus according to claim 1, wherein the verification function verifies the predetermined program based on a power-on of the image forming apparatus, and the power supply starts supplying power to the predetermined unit based on the power-on of the image forming apparatus before the verifying of the predetermined program is completed.

16. An image forming apparatus configured to supply power to a controller unit and a predetermined unit in response to an activation of the image forming apparatus, the image forming apparatus comprising:
   a validation unit configured to validate authenticity of a signature included in a predetermined program to be activated after the power is supplied to the controller unit and the predetermined unit,
   wherein supply of the power to the predetermined unit is stopped based on a fact that the authenticity of the signature included in the predetermined program fails to be validated by the validation unit.

17. The image forming apparatus according to claim 16, wherein the predetermined unit includes at least a printer unit configured to print an image on a sheet.

18. The image forming apparatus according to claim 17, wherein the predetermined unit farther includes a scanner unit.

19. The image forming apparatus according to claim 17, wherein the printer unit includes a fixing device and a printer controller, and
   wherein the printer controller is configured to control supply of power to the fixing device.

20. The image forming apparatus according to claim 19, wherein the printer controller is configured to stop the supply of the power to the fixing device before the supply of the power to the predetermined unit is stopped based on the fact that the authenticity of the signature included in the predetermined program fails to be validated by the validation unit.

21. The image forming apparatus according to claim 16, further comprising a switch configured to switch between supplying and stopping the power to be supplied to the predetermined unit,
   wherein the controller unit is configured to perform validation of the authentication of the signature included in the predetermined program by the validation unit and control the switch based on another program other than the predetermined program.

22. The image forming apparatus according to claim 21, further comprising another validation unit configured to validate authenticity of a signature included in the another program,
   wherein a sub controller unit included in the controller unit is configured to execute a boot program in response to the activation of the image forming apparatus, whereby the another validation unit validates the authenticity of the signature included in the another program.

23. The image forming apparatus according to claim 16, wherein supply of the power to the controller unit is not stopped if the supply of the power to the predetermined unit is stopped.

24. The image forming apparatus according to claim 16, further comprising a notification unit configured to make a notification of a message,
   wherein the notification unit is configured to make a notification that the authenticity of the signature included in the predetermined program fails to be validated by the validation unit.

25. The image forming apparatus according to claim 24, wherein the message is notified before the supply of the power to the predetermined unit is stopped, or simultaneously with a stop of the supply of the power to the predetermined unit.

26. The image forming apparatus according to claim 24, wherein the message is notified after the supply of the power to the predetermined unit is stopped.

27. The image forming apparatus according to claim 24, wherein the message appears on a screen displaying an error code.

28. The image forming apparatus according to claim 16, wherein the activation of the image forming apparatus refers to a transition from a state in which power is not supplied to the image forming apparatus to a state in which power is supplied to the image forming apparatus.

29. The image forming apparatus according to claim 28, wherein the transition of power supply upon the activation of the image forming apparatus is performed by a user selecting a power key.

30. A method for controlling an image forming apparatus having a verification function of verifying a predetermined program, the method comprising:
   verifying the predetermined program;
   starting supplying power to a predetermined unit of the image forming apparatus by a power supply before the verifying of the predetermined program is completed;
   if the predetermined program is confirmed to be authentic by the verifying, executing the predetermined program by a controller of the image forming apparatus; and
   if the predetermined program is confirmed not to be authentic by the verifying, stopping supplying power from the power supply to the predetermined unit.

* * * * *